United States Patent [19]

Selsing

[11] Patent Number: 4,497,975
[45] Date of Patent: Feb. 5, 1985

[54] RESISTOR AND CAPACITOR GRADED TERMINATION

[75] Inventor: Jorgen Selsing, Oak Forest, Ill.

[73] Assignee: G & W Electric Company, Blue Island, Ill.

[21] Appl. No.: 440,842

[22] Filed: Nov. 12, 1982

[51] Int. Cl.³ .................. H02G 15/30; H02G 15/072
[52] U.S. Cl. ...................................... 174/19; 174/73 R
[58] Field of Search ............... 174/15 BH, 19, 73 R, 174/73 SC, 143; 338/300

[56] References Cited

U.S. PATENT DOCUMENTS

| | | | |
|---|---|---|---|
| 1,868,962 | 7/1932 | Atkinson | 174/73 R |
| 2,794,063 | 5/1957 | Nicholas | 174/143 |
| 3,289,139 | 11/1966 | Hyde | 338/300 X |
| 3,539,703 | 11/1970 | Cloud | 174/19 |
| 4,056,680 | 11/1977 | Aihara et al. | 174/19 |
| 4,228,318 | 10/1980 | Selsing | 174/73 R |

Primary Examiner—Laramie E. Askin
Attorney, Agent, or Firm—Fitch, Even, Tabin & Flannery

[57] ABSTRACT

A termination is provided for terminating a high voltage DC cable. The termination has an outer annular insulator containing stacked capacitor elements for relieving electrical stress at the prepared end of the cable when the cable is carrying transient AC currents produced when the DC current is changed, e.g. during polarity switching. A plurality of resistors are interconnected by annular electrically conductive elements interposed between vertically adjacent capacitor elements to provide a highly resistive pathway from the cable conductor to ground, relieving the electrical stress created by DC current. The annular electrically conductive elements also serve to dissipate heat produced by the cable conductor. Preferably the capacitors provide sufficient stress relief that the cable may alternatively be used to carry high voltage AC current.

4 Claims, 4 Drawing Figures

RESISTOR AND CAPACITOR GRADED TERMINATION

The present invention relates generally to high voltage terminations and more particularly to terminations for high voltage DC cable.

BACKGROUND OF THE INVENTION

Terms which have been used interchangeably in industry to refer to a construction provided at the end of an insulated high voltage cable to bring about a desired potential gradient from the base conductor to the conductive sheath of the high voltage cable include termination, terminator, terminal and potential head or "pothead". The terminology presently employed in describing cable terminations is generally covered in a publication by the Institute of Electrical and Electronic Engineers (I.E.E.E.) identified as Std 48-1975 entitled "IEEE Standard Test Procedures and Requirements for High Voltage Alternating-Current Cable Terminations", issued May 9, 1975.

In preparing the end of a high voltage cable for termination, the outer conductive sheath or shield layer is normally cut back a predetermined distance from the end of an insulation layer which, in turn, is cut back from the axial conductor so as to expose an end portion thereof. The shield layer is cut back sufficiently to provide adequate creepage distance between the live conductor and the grounded shield layer. It is known that if two electrically conducting bodies, such as an axial conductor and a coaxial conductive shield layer of a high voltage cable, are separated by a distance small in comparison with the surface dimensions of the conducting bodies, the electrical field in the region between the bodies is substantially uniform and perpendicular to the surfaces of the conducting bodies. The difficulty, however, comes at the boundaries of the conducting bodies or at the boundary of one of them if its area is much less extensive than the area of the other conductor, such as when the shield layer of a high voltage conductor cable is cut back from the axial conductor and a portion of the insulation layer.

Cutting back the shield and insulation layers creates an abrupt discontinuity in the electrical characteristics of the cable and materially increases the maximum voltage gradient (volts/mil) of the insulation in the area of the shield end. The increase in voltage gradient at the shield end changes the shape of the resulting electrical field so that the stress is no longer uniform and normal to the adjacent surfaces of the conducting bodies but produces a large component of stress along the surface of the insulation in a direction parallel to the conducting surfaces. Thus, the maximum voltage gradient is shifted from a radial stress, which diminishes outwardly from the conductor, to a longitudinal stress at the end of the cable shield layer. The nature of the cable insulation is such that it more readily withstands an electrical stress in the radial direction than along its longitudinal surface so that the risk of breakdown is substantially greater in the longitudinal direction.

At the present time, almost all electrical power is generated and transmitted as AC current, the transmission of AC current resulting in minor impedance losses relative to the transmission of DC current. AC transmission does, however, result in substantial dielectric loss whereas DC transmission results in relatively minor amounts of dielectric loss. At very high voltages, i.e., above 1,000 KV, the total DC power loss through impedance and dielectric loss is less than the total power loss resulting from AC transmission, and it is contemplated that power will be increasingly transmitted by DC current in the future and effective terminations are needed for high voltage DC cable.

For terminations of relatively low voltage cables, whether AC or DC, it is sufficient to interpose an effective dielectric layer between the unshielded end of the cable and the grounded end of the shield. For high voltage AC cable, i.e., above about 100 KV, capacitive elements are commonly used to relieve the electrical stress between the high potential of the conductor and the grounded (zero potential) end of the shield. U.S. Pat. No. 4,228,318 is an example of a termination for AC-carrying cable which incorporates a stress relief cone extending from the end of the cable shield and capacitors stacked in coaxial relation along the length of an exposed insulation layer and the underlying axial conductor. If constructed of sufficient size, such terminations may be made sufficiently large to terminate cables carrying upward of 600 KV AC.

Electrical stress in DC cable terminations is not relieved by capacitor shields when the current is constant but may be relieved instead through a highly resistive path between the conductor and ground which provides a suitable gradient of electrical potential to prevent dielectric breakdown with a minimal power loss therethrough. A steady current, however, is not maintained at all times in high voltage DC transmission, and there are many situations where the potential varies greatly, e.g., during polarity reversals. When the DC potential is changed, substantial transient currents are produced in DC cable, and a DC terminator must relieve the electrical stress resulting from these transients.

U.S. Pat. No. 3,539,703 discloses a high voltage termination for AC or DC-carrying cable. A plurality of conducting members and a plurality of insulating members are alternately wrapped in overlapping relationship, providing capacitance shielding for AC applications. For DC termination, the wrapped conducting members are interconnected through their edges by a spiral of resistors which provide a highly resistive pathway between the conductor and ground. The capacitive-resistive shielding is covered with an outer layer of insulating material which covers all the projections of the resistors.

Terminations having electrical shielding of the type described in U.S. Pat. No. 3,539,703 may be effective in laboratory situations; however, they would not be useful in high voltage DC electrical installations, i.e., above about 100 KV. The spiral of resistors interconnecting the conductive elements would produce significant amounts of heat that would not be effectively dissipated in the outer layer of insulating material, resulting in eventual burn-out of resistors. The failure of any resistor within the spiral would destroy the DC stress relief. Furthermore, it is believed that the capacitive arrangement could not be utilized for AC applications above about 100 KV.

SUMMARY OF THE INVENTION

In accordance with the present invention, an improved electrical termination is provided for prepared ends of high voltage DC cables. The termination has an outer annular insulator and a plurality of annular capacitors in stacked relationship, defining a passageway for receiving the prepared end of the cable therethrough, the stacked capacitors providing an electrical gradient for the unshielded portion of the conductor when it is subjected to the voltage transients produced when the DC potential is changed. A plurality of annular electrically conductive members are interposed between adjacent stacked capacitors and are interconnected by resistor elements which provide a voltage gradient between the conductor and ground for relieving the electrical stress created by the presence of high DC voltage on the conductor.

As one feature of the invention, it is found that a particularly suitable type of resistor for providing the electrical pathway from the terminated conductor to ground is a film type resistor in which a resistive film forms a spiral around an insulating core.

As another feature of the invention, at least two resistors interconnect, in parallel, each pair of adjacent stacked conductive elements, whereby the electrical gradient from the conductor to ground is maintained upon failure of any one resistor.

BRIEF DESCRIPTION OF THE DRAWINGS

FIG. 4 is an elevation view of a resistor element utilized in the capacitor-resistor stack of FIG. 2.

DETAILED DESCRIPTION OF THE PREFERRED EMBODIMENT

Figure 1:
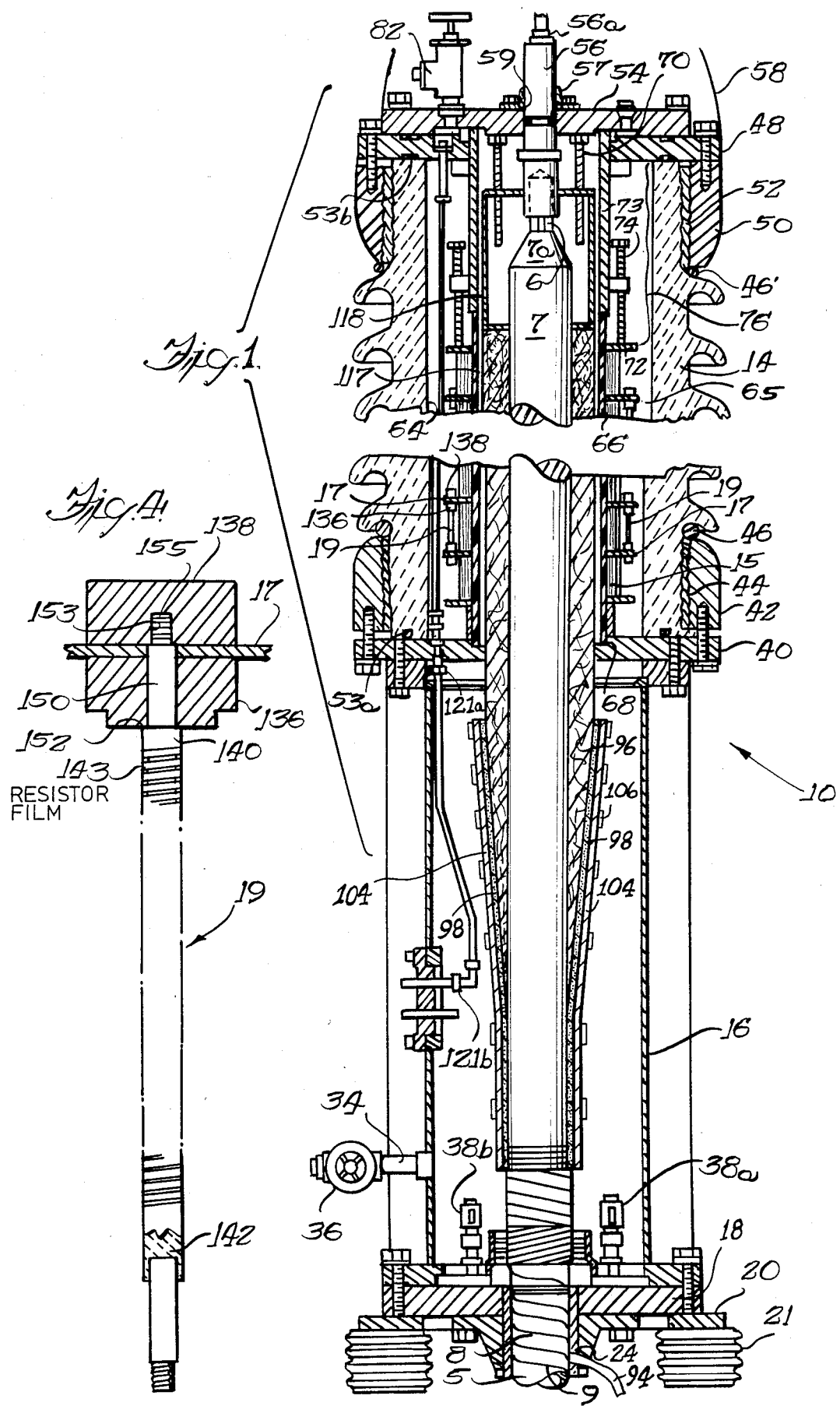
FIG. 1 is a longitudinal sectional view of a high voltage cable termination embodying various features of the present invention.

The invention will be described herein in reference to the termination of shielded cable 5 commonly used for high voltage transmission. The cable 5 has an axial conductor 6 encased in an insulating layer 7 and a surrounding shield 8 which is grounded by a wrap 9 of metal wire or tape. In preparing the end of the cable 5 for termination, the grounding wrap 9 is unwound, and portions of the outer conductive shield 8 and insulation 7 are stripped back to expose predetermined lengths of the axial conductor 6 and insulation layer. The prepared end of the cable 5 is secured within an upstanding riser 24 or manifold wherein the shield is conductively grounded.

In accordance with the present invention, the prepared end of the cable 5 is terminated in a termination or pothead 10 providing relief of electrical stress whether the cable is carrying AC or DC current. The termination 10 may be constructed of sufficient size to relieve electrical stress of cable carrying upwards of 600 KV AC or 1200 KV DC for extended periods of continuous use. The termination 10 has an outer annular insulator 14 and a plurality, such as seventeen, of annular capacitor elements or capacitors 15 stacked coaxially on the unshielded portion of the prepared cable end for relieving electrical stress when the cable is carrying AC current which may be transient currents resulting from change of DC potential. To relieve electrical stress when the cable is carrying DC current, a plurality of annular conductive elements 17 are interposed between adjacent stacked capacitors 15, and a plurality of resistor elements or resistors 19 interconnect adjacent electrically conductive elements so as to form a highly resistive pathway and a distributed voltage gradient between the conductor and the grounded cable shield 8.

Referring now in greater detail to the illustrated embodiment of the cable termination 10, the annular insulator 14 is supported on a generally tubular entrance body section 16 having a base entrance plate 18 fixed in any suitable manner on a mounting plate 20. The mounting plate 20 is, in turn, supported on a suitable framework (not shown) through support insulators 21 so as to support the cable termination 10 in upstanding relationship.

In the illustrated embodiment, the cable termination 10 is adapted for use with an oil-filled pipe type cable system under high pressure. The entrance body section 16 is also adapted to have an insulating liquid dielectric introduced therein by means of an entrance conduit 34 having a control valve 36 connected in-line therewith. The insulating liquid dielectric is typically a high dielectric strength oil. Internal filter bypass units 38a and 38b are mounted within the entrance body section 16, as is known.

As best seen in FIG. 1, the porcelain insulator section 14, which may be eight meters or longer in length, is mounted at its lower end on a mounting plate 40 which forms an upper end of the entrance body section 16. To this end, a bronze cementing flange 42 is attached to the porcelain insulator by a suitable cementing material 44 and is bolted to the mounting plate 40. An annular cushion gasket 46 is interposed between the upper end of the flange 42 and the insulator 14. An annular mounting plate 48 is mounted on the upper end of the porcelain insulator 14 by bolting the mounting plate to an annular cementing flange 50 which is secured on the insulator by a suitable cementing material 52. An annular cushion gasket 46' is interposed between the flange 50 and insulator 14 in a similar manner to gasket 46. Annular sealing gaskets 53a and 53b are interposed between the insulator 14 and the respective mounting plates 40 and 48. A stainless steel closure or cap plate 54 is mounted on the stainless steel mounting plate 48 and receives a connector 56 axially therethrough. A sealing cap 57 and associated O-ring seal 59 are mounted on the cap plate 54 about the connector 56. A corona shield 58 is mounted on the mounting flange 48 so as to cover the upper end of the termination 10 and has a central aperture to receive the upper end of the connector 56 therethrough.

The plurality of annular capacitors 15 are supported on the mounting plate 40 internally of an axial bore 64 in the porcelain insulator 14. The capacitors 15 are of similar physical size and preferably comprise spirally wound layers of paper, such as electrical grade kraft paper, and aluminum strips which are wound in alternating layers and bound about their outer surfaces by a suitable tape binder. The capacitors 15 have outer diameters less than the inner diameter of the insulator bore 64 so as to define an annular passage 65 therebetween, permitting the introduction of an insulating liquid dielectric.

The capacitors 15 are assembled coaxially over a cylindrical barrier support tube 66 which is typically formed of opoxy or phenolic material and has an outer cylindrical surface sized to snugly engage the inner cylindrical surfaces of the capacitors 15. The lower end of the support tube 66 is received within a counterbore 68 in the mounting plate 40 and is retained therein by a sleeve 73 which depends from the cap plate 54.

A capacitor stack blocking plate 72 engages the upper end of the capacitor stack and is held down by adjustment screws 74 mounted from the side of the depending sleeve 73. A conductor lead 76 connects the blocking plate 72 at the upper end of the capacitor stack to a suitable terminal on the mounting plate 48. The capacitors 15 establish regions of substantially parallel equipotential planes between adjacent pairs of the stacked capacitors, it being appreciated that, in the illustrated embodiment, the equipotential planes are substantially normal to the axis of the cable 5.

A suitable valve 82 is mounted on the cap plate 54 and communicates with the internal volume of the termination 10 and the cable 5. The valve 82 is adapted for connection to a vacuum source (not shown) and, after assembling the termination 10 onto the prepared cable 5, the valve is opened to evacuate the termination prior to filling with an insulating oil dielectric in accordance with conventional techniques.

The high voltage cable 5 is installed within the termination in a more or less standard manner, the cable extending upwardly through the riser pipe or tube 24 and through a suitable oil semistop gland seal which acts either directly on the outer cable shield layer 8 of the cable or on an auxilliary wrap layer 9. The shield layer 8 is conductively connected to ground in a conventional manner, such as through a conductor 94.

The cable 5 extends into the entrance body section 16 where the shield layer 8 is terminated in a stress relief cone element formed by conventional techniques from wrappings of a paper roll 96 tapered upwardly and outwardly from the insulation layer and covered with a sleeve 98 of semiconducting material which extends along a length of exposed insulation layer 7 to the cutback terminal end of the cable shield layer 8. A plurality of flat wires or strips 104 of copper or other suitable conductive material extend longitudinally along the lower end of the shield layer 8 and the semiconducting sleeve 98, the strips 104 being spaced circumferentially about the cable in a spaced-apart arrangement and held together by wire servings 106.

The paper roll 96 is impregnated with the insulating liquid dielectric to form thin layers of high dielectric strength which extend upwardly along the cable insulation layer 7 and terminate at the lower end of a blocking tube 118 which is clamped between the paper roll and the upper cap plate by adjustable screws 70. The paper roll 96 is spaced slightly from the inner surface of the capacitor stacking tube 66 to form a small oil gap 117 therebetween. The blocking tube 118 is slotted (not shown) to permit the cavity defined therewithin to be filled with liquid dielectric as are all of the remaining zones within the interior space in the porcelain insulator 14.

The insulation layer 7 is tapered at its upper terminal end 7a, and the bared axial conductor 6 is inserted and fixed within an axial bore in the connector 56. It will be understood that suitable seals are provided to prevent oil leakage about the connector 56 which terminates at its upper end in an aerial connector stub 56a. Power factor test bushings 121a and 121b of known design are mounted within the entrance body section 16 as shown in FIG. 1.

Figure 3:
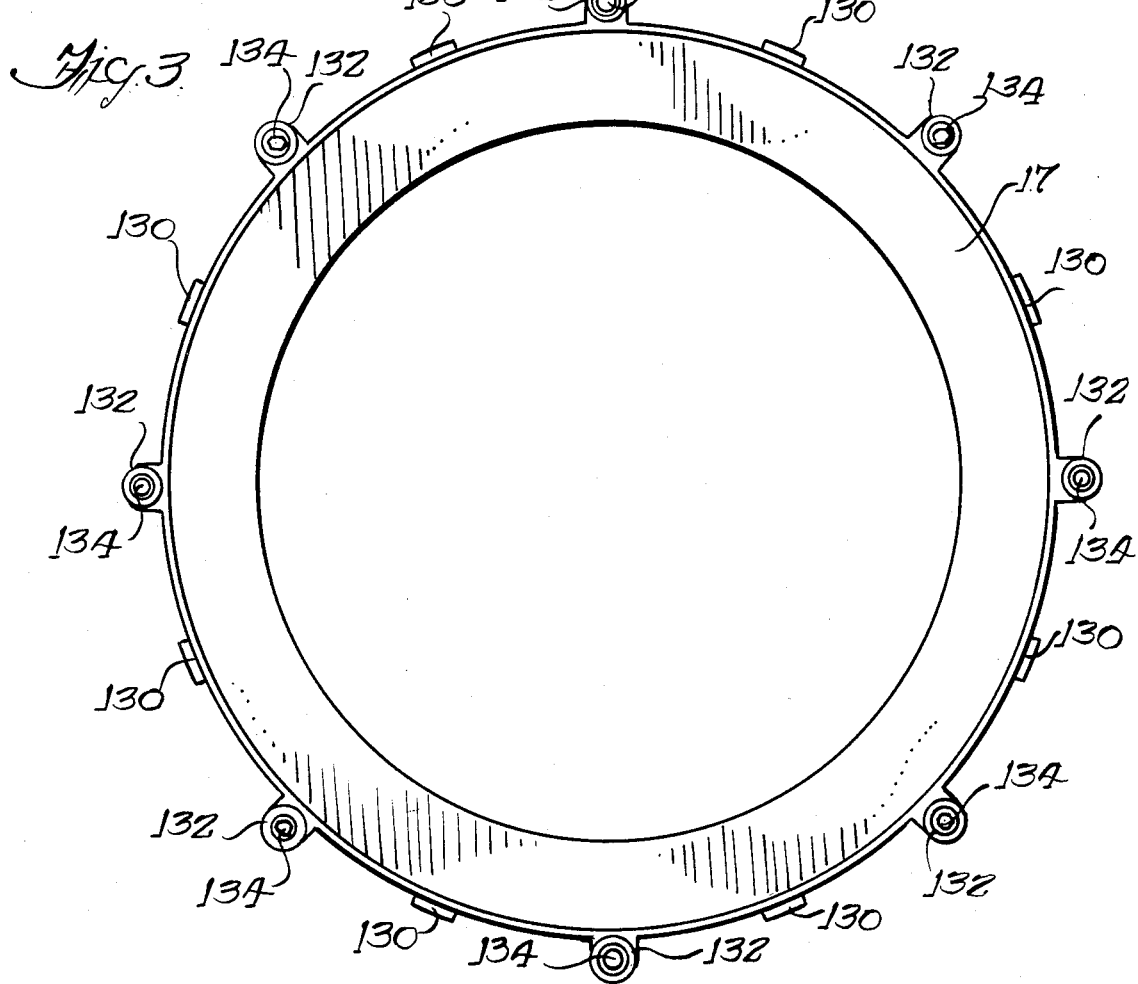
FIG. 3 is a plan view of a conductive ring utilized in the capacitor-resistor stack of FIG. 2.

In the preferred arrangement for providing stress relief for DC-carrying cable terminations, the capacitors 15 are stacked with the annular electrically conductive elements 17 interposed between adjacent capacitors. As best seen in FIG. 3, the annular electrically conductive elements 17 are generally in the form of flat rings. The interior and exterior diameters of the rings are generally equal to the interior and exterior diameter of the capacitors 15, providing the stack with a generally uniform interior and exterior surface. A typical stack of capacitors 15 and rings 17 may have an inside diameter of $10\frac{1}{2}''$ and an outside diameter of $12\frac{1}{2}''$. The electrically conductive rings 17 have a plurality of tabs 130, some extending upward and some extending downward along the outer surfaces of the adjacent capacitors 15 and serve to clamp each capacitor element between successive conductive rings 17. Additional lateral tabs 132 extend outward of the rings having openings 134 for receiving the ends of the resistors 19 which interconnect adjacent rings. The lateral tabs 132 space the resistors 19 outward of the exterior surface of the capacitors 15 so that the resistors are fully surrounded by heat-dissipating oil. The resistor array is electrically connected to the conductor 6 through blocking plate 72 and lead 76 and grounded through the mounting plate 40.

Although a single resistor 19 interconnecting each pair of successive conductive rings 17 would be sufficient to form a resistive path between the conductor 6 and ground, it is highly preferable to provide at least two resistors, connected in parallel, between each pair of adjacent conductive rings, to maintain the resistive path even if one of the parallel resistors should fail. In the illustrated embodiment, and as best seen in FIG. 3, eight tabs 132, spaced 45° from each other, extend laterally outward, and alternating tabs of each ring receive resistors connected to the next lower or next higher conductive ring 17. The resistive path between the conductor and ground is thereby evenly distributed about the cable. For larger terminations, each conductive ring 17 may have twelve or more lateral tabs for displacing the resistors at adjacent levels 30° or less. The four resistors 19, which are connected in parallel to each pair of adjacent conductive rings 17, provide the necessary redundancy to ensure that the resistive gradient will be maintained irrespective of the failure of any single resistor 19. If one of the four resistors 19 at each layer should fail, the total resistance between the pair of adjacent conductive rings 17 increases by about a third. Preferably, the resistors 19 have a resistance appropriate to relieve the electrical stress for a cable at the anticipated voltage even if two resistors at any level should fail.

The highly resistive pathway between the conductor and ground relieves dielectric stress which could otherwise cause dielectric breakdown. The resistance of the resistor array is sufficiently high that the current therethrough for a cable carrying 1200 KV is less than about 0.002 amp, representing a minimal power loss at the termination.

In addition to electrically interconnecting the array of resistors 19, the electrically conductive rings 17 serve the function of heat transfer as described in U.S. Pat. No. 4,228,318. In the termination 10, the insulating liquid dielectric, which fills the paper insulation roll 96 and the area internally of the stacked capacitors 15, remains generally static so that radial transfer of heat produced by the conductor is relatively poor. The electrically conductive rings 17 are preferably made of copper or some other metal having high thermal conductivity. The electrically conductive rings 17, like the flat ends of the capacitors 15, lie in the regions of parallel equipotential planes so as not to change the initial shape of the equipotential surface. Because the electrically conductive rings 17 do not change the shape of the equipotential planes, they may have sufficient thickness to provide the desired heat transfer cross-sectional area. For a termination 10, which alternatively carries 600 KV AC or 1200 KV DC, the thickness of the rings 17 is preferably about 0.027 inch.

Referring now to FIG. 4, film type resistors 19 having semiconductive layers 140 spiraled around ceramic cores 142 are particularly suitable for providing the high resistance necessary for use in the high voltage terminations 10. Such a resistor is produced by coating a ceramic core 142 with a semiconducting glaze 140. Portions of the glaze 140 are ground away in a spiral pattern leaving a spiral 143 of semiconductive material of predetermined pitch. The pattern of the semiconductive spiral 143 determines the resistance of the resistor. Suitable film materials include, but are not limited to, tin oxides, antimony oxides and mixtures thereof.

Figure 2:
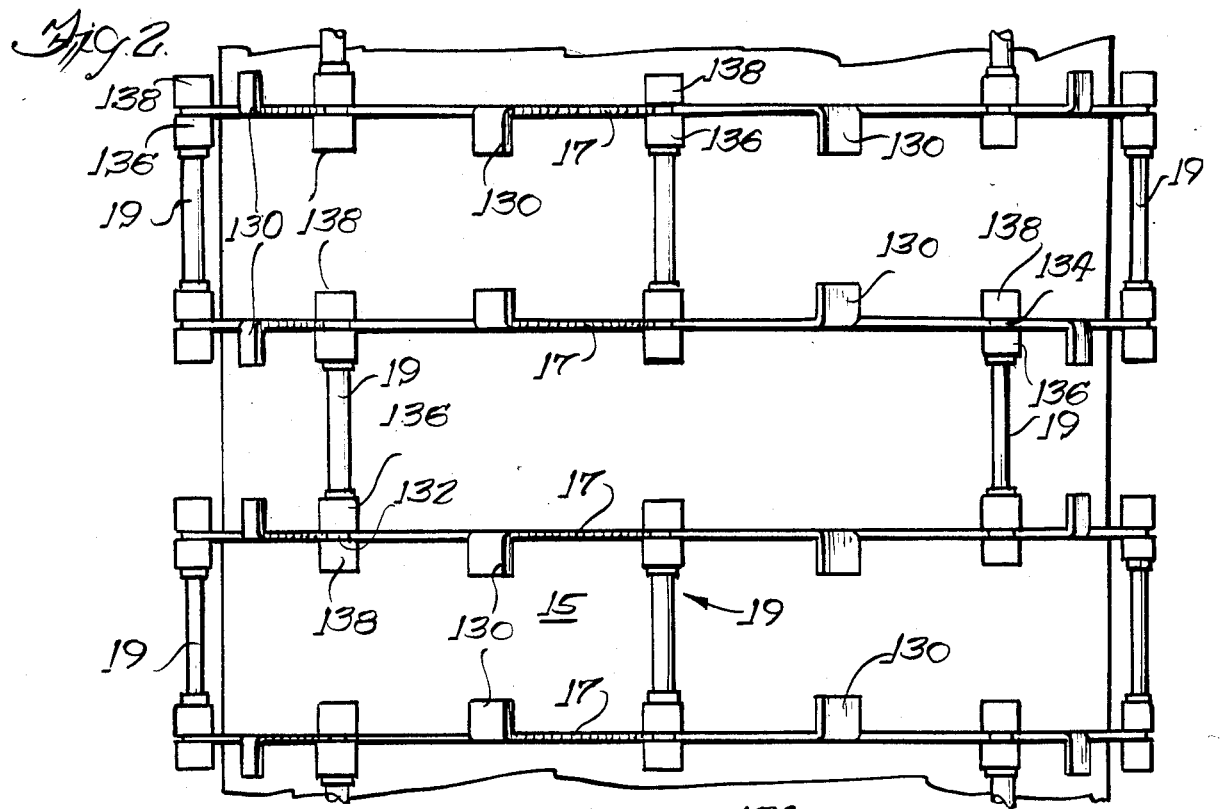
FIG. 2 is an enlarged elevation view of a portion of the capacitor-resistor stack used in the termination of FIG. 1.

To prevent hot spots from forming at the connections of the ends of the resistors and the associated lateral tabs 132 which could break down the dielectric oil, an arrangement of fittings 150 and caps 136, 138 is provided, as illustrated in FIGS. 2 and 4. Cylindrical metal fittings or shanks 150 (FIG. 4) extend from both ends of the ceramic core 142. The metal shanks 150 have diameters less than that of the ceramic core 142 to provide shoulders 152 at the ends of the ceramic core. Inner caps 136 having axial bores are received on the metal fittings 150 between the shoulders 152 and the conductive rings 17, and outer caps 138 having threaded closed end bores 153 are screwed over threaded outer ends 155 of the metal fittings 150. Preferably the caps 136, 138 are formed of brass that is coated with cadmium.

While the invention has been described in terms of a preferred embodiment, it will be understood that changes and modifications may be made therein without departing from the invention in its broader aspects.

Various features of the invention are set forth in the following claims.

What is claimed is:

1. A termination of a prepared end of a cable, the cable having a conductor, an insulating layer therearound and a grounded outer shield, the termination being adapted when constructed of sufficient size for shielding the cable when carrying DC power in the high potential range whereat power losses in DC transmission approach or become less than power losses in AC transmission, the termination comprising an outer annular insulator, a plurality of annular capacitors stacked axially within said insulator and defining an axial passageway for receiving the prepared end of the cable therethrough, said capacitors each comprising a strip of dielectric material and a strip of metal wound as alternate layers coaxial with said insulator, said capacitors providing sufficient capacitance for relieving electrical stress resulting from transient AC currents attendant a cable carrying the high potential DC power, electrically and thermally conductive rings interposed between adjacent ones of said stacked capacitors, said rings having interior diameters substantially matched to the interior diameters of said capacitors, exterior diameters at least about as great as the exterior diameters of said capacitors, and tab means extending outward of said stacked capacitors for connection to resistors, at least two resistors electrically connected to said tab means and interconnecting, in parallel, successive stacked rings so as to provide a highly resistive pathway from the conductor to ground to relieve the electrical stress of the high potential DC power, said resistors each having a ceramic core and a semiconductive film spiralled therearound, and liquid dielectric contained within said outer annular insulator and immersing said resistors and said capacitors.

2. A termination according to claim 1 wherein said capacitors provide sufficient capacitance for electrical stress relief of said cable when said cable carries AC power at a potential of 600 kV and upwards.

3. A termination according to claim 1 having at least four resistors interconnecting, in parallel, successive stacked capacitors.

4. A termination according to claim 1 wherein said film is formed from material selected from the group consisting of tin oxides, antimony oxides and mixtures thereof.

* * * * *